United States Patent
Taylor

(10) Patent No.: US 6,718,691 B2
(45) Date of Patent: Apr. 13, 2004

(54) FASTENER TO SECURE AND TRAIN BRANCHES OF A VINE OR PLANT TO A HORIZONTAL SUPPORT WIRE OR OTHER SUPPORT STRUCTURES

(76) Inventor: Jim Taylor, 14311 Newport Ave., #G533, Tustin, CA (US) 92780

( * ) Notice: Subject to any disclaimer, the term of this patent is extended or adjusted under 35 U.S.C. 154(b) by 0 days.

(21) Appl. No.: 09/799,350

(22) Filed: Mar. 6, 2001

(65) Prior Publication Data

US 2002/0124464 A1 Sep. 12, 2002

(51) Int. Cl.[7] .......................... A01G 17/06; A01G 17/14
(52) U.S. Cl. .................. 47/44; 47/46; D25/100; 256/57; 248/67.6; 248/218.1; 24/455; 24/545
(58) Field of Search ................ 47/44–47, 4, 70; D25/100; 256/57; 248/67.7, 218.1; 24/300, 301, 545, 555, 557, 565, 459, 298, 339, 455, 343, 369, 373, 530, 115 R, 689.1

(56) References Cited

U.S. PATENT DOCUMENTS

| | | | | |
|---|---|---|---|---|
| 525,010 A | * | 8/1894 | Puller | |
| 3,186,704 A | * | 6/1965 | McCloskey et al. | |
| 4,050,187 A | * | 9/1977 | Geiger et al. | 47/45 |
| 4,550,891 A | * | 11/1985 | Schaty | 248/68.1 |
| D287,564 S | * | 1/1987 | McCully | D8/1 |
| 4,649,666 A | * | 3/1987 | Ness et al. | 47/43 |
| 4,655,000 A | * | 4/1987 | Swick et al. | 47/44 |
| 5,056,198 A | * | 10/1991 | Viglione | 24/336 |
| D438,372 S | * | 3/2001 | Taylor | D3/10 |
| D438,449 S | * | 3/2001 | Taylor | D8/356 |
| 6,254,049 B1 | * | 7/2001 | Goehly | 248/302 |

FOREIGN PATENT DOCUMENTS

DE    2841987    *  9/1978  ........ A01G/17/10

OTHER PUBLICATIONS

AgFast Corp., Vineyard & Orchard Specialists, BranchLok.
AgFast Corp., Tying Devices, BranchLok, 3 pages.*

* cited by examiner

Primary Examiner—Peter M. Poon
Assistant Examiner—Andrea Valenti
(74) Attorney, Agent, or Firm—Shlesinger, Arkwright & Garvey LLP

(57) ABSTRACT

A fastener to secure and train branches of a vine or plant to a horizontal support wire or other structures comprises a longitudinal body including first and second hook portions and a longitudinal flexible member having first and second ends connected to the respective first and second hook portions. The first and second hook portions are mirror images of each other but rotated 180°.

11 Claims, 2 Drawing Sheets

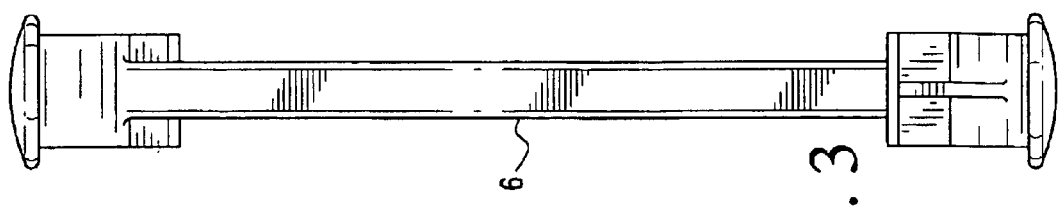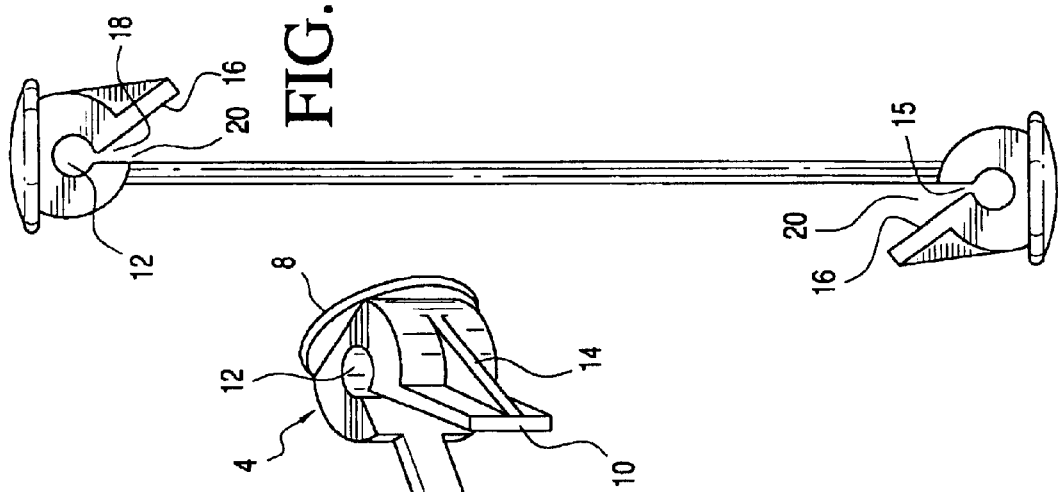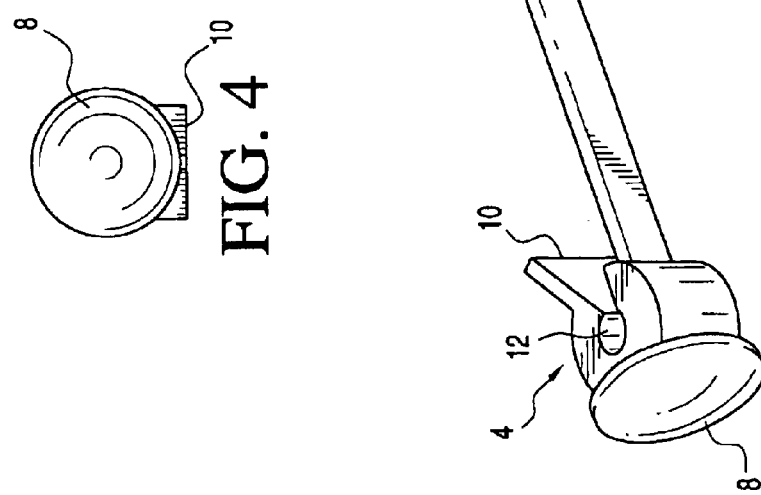

FASTENER TO SECURE AND TRAIN BRANCHES OF A VINE OR PLANT TO A HORIZONTAL SUPPORT WIRE OR OTHER SUPPORT STRUCTURES

FIELD OF THE INVENTION

The present invention is directed to branch-to-wire fasteners or supports used for the lateral training of trellised branches and vines to a support wire or other support structures.

OBJECTS AND SUMMARY OF THE INVENTION

It is an object of the present invention to provide a fastener or support for securing and training limbs or branches of vines and plants to a support wire or other support structures that is relatively easy to install.

It is another object of the present invention to provide a fastener or support for securing and training limbs or branches of vines and plants to a support wire or other support structures that has a relatively planar support surface so as to distribute the restraining force on the supported limb or branch, thereby minimizing any injury to the plant at the point of support.

In summary, the present invention provides a fastener or support to secure and train branches of a vine or plant to a horizontal support wire or other support structures, comprising a longitudinal body including first and second hook portions and a longitudinal flexible member having first and second ends connected to the respective first and second hook portions. The first and second hook portions are mirror images of each other but rotated 180°.

These and other objects of the present invention will become apparent from the following detailed description.

BRIEF DESCRIPTION OF THE DRAWINGS

FIG. 1 is a perspective view of a fastener or support made in accordance with the present invention.

FIG. 2 is a side elevational view of FIG. 1.

FIG. 3 is a left side view of FIG. 2.

FIG. 4 is an end view of FIG. 1.

DETAILED DESCRIPTION OF THE INVENTION

Figure 5:
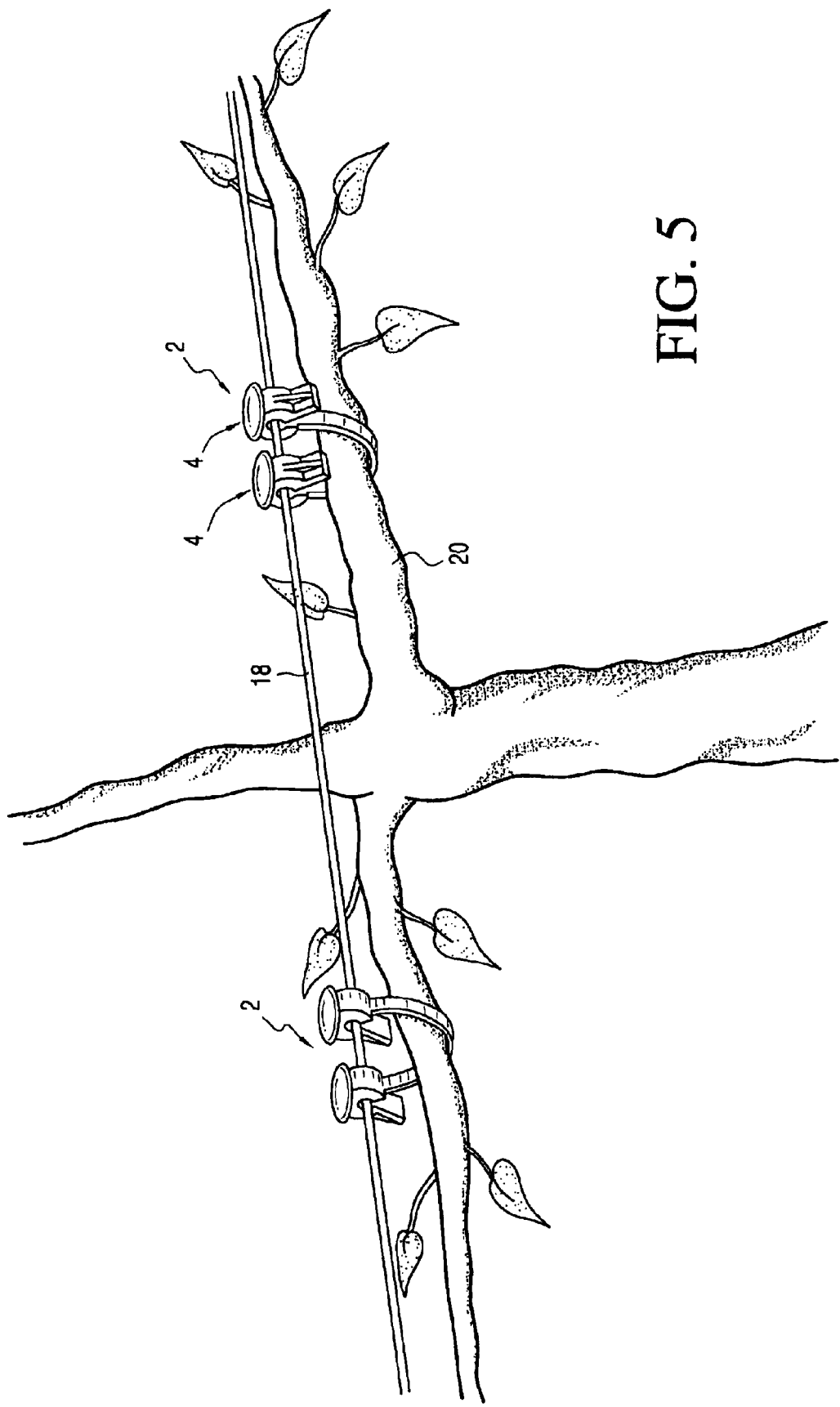
FIG. 5 shows a pair of fasteners of FIG. 1 as used to support and train lateral branches of a vine from a support wire.

A fastener or support 2 made in accordance with the present invention is disclosed in FIG. 1. The fastener 2 comprises a pair of hook portions 4 joined to each other by a member 6. Each hook portion includes a crown 8, a finger hold 10 and an opening 12. A stiffener 14 helps reduce tension fatigue to the finger hold 10. The opening 12 is sized to receive the support wire or other support structures. A slot 15 communicates with the opening 12 and has a smaller clearance than the diameter of the opening 12 so that a wire would snap past the slot 16 and be received within the opening 12. Once within the opening 12, the wire would be retained there to avoid inadvertent disengagement. The opening 12 is preferably sized substantially the same as the diameter of the wire, although a larger opening than the wire diameter would also work.

Each hook portion 4 is a mirror image of the other turned 180°, as best shown in FIG. 2. The fastener 2 is preferably molded in one piece of plastic material. The connecting member 6 has sufficient flexibility to bend around the branch being trained.

The finger hold 10 includes a ramped surface 16 to facilitate securing to the support wire.

In use, one of the hook portions 4 is first secured to the supporting wire 18 by forcing the wire through the slot 15 and into the opening 12. The connecting member 6 is then bent to a U-shape to enclose the cane or branch 20 being trained. The other hook portion 4 is then secured to the wire 18. Due to the 180° orientation of one hook portion from the other, both hook portions will attain the same orientation when secured to the wire, thereby providing ease of securing the hook portions to the supporting wire. If the hook portions 4 were not turned 180° from each other, then securing the second hook portion would mean threading it between the wire and the twig in an "over and under" motion. In contrast, with the present invention, with the hook portion turned 180° from each other, a simple "over" motion is adequate to secure the hook portions to the supporting wire.

The ramped surface 16 advantageously facilitates in hooking the hook portion 4 onto the supporting wire 18. The large crown 10 provides a comfortable surface for a finger, such as the thumb, to rest on while another finger holds the finger hold 10 to snap the hook portion 4 onto the support wire.

The crown 8 is preferably circular, as shown in FIG. 4, and has a convex shape to advantageously provide a larger bearing surface against the user's finger when installing the fastener, as shown in FIG. 2. The connecting member 6 is advantageously planar in cross-section, as shown in FIGS. 2 and 3, to provide a relatively larger contact width surface when engaging a branch, thereby spreading the force exerted by the connecting member against the branch to avoid damaging the branch.

The ramped surface 16 and an opposing surface of the member 6 forms an entry way 20 for the support wire. Each entry way 20 faces each other on opposite sides of the member 6.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A fastener to secure and train branches of a vine or plant to a horizontal support wire, comprising:

a) a longitudinal body including first and second hook portions and a longitudinal flexible member having first and second ends connected to respective said first and second hook portions;

b) said first and second hook portions are mirror images of each other but rotated 180° such that said hook portions are oriented in substantially the same direction when secured to the support wire;

c) each of said hook portions including a first opening for receiving the support wire;

d) said longitudinal flexible member bending into a loop to define a second opening through which a branch extends when said hook portions are disposed adjacent to each other on the wire support; and e) said first and second openings being disposed substantially in the direction of the support wire.

2. A fastener as in claim 1, wherein said member is planar in cross-section.

3. A fastener as in claim 1, wherein:

a) each of said hook portions includes a ramped surface connected to a slot communicating with said first opening.

4. A fastener as in claim 1, wherein each of said hook portions has an entry way for the support wire.

5. A fastener as in claim 4, wherein said entry way is V-shaped.

6. A fastener as in claim 4, wherein said entry way includes a stiffener.

7. A fastener as in claim 1, wherein each of said hook portions includes a crown portion.

8. A fastener as in claim 7, wherein said crown portion is convex.

9. A fastener as in claim 7, wherein said crown portion is circular in plan view.

10. A fastener as in claim 1, wherein said body is plastic.

11. A fastener as in claim 1, wherein said body is integral.

* * * * *